P. EVANS.
MOTOR TRACTOR.
APPLICATION FILED APR. 19, 1912.

1,228,306.

Patented May 29, 1917.
7 SHEETS—SHEET 1.

Witnesses—

Inventor—
Powell Evans.
by his Attorneys—
Howson & Howson

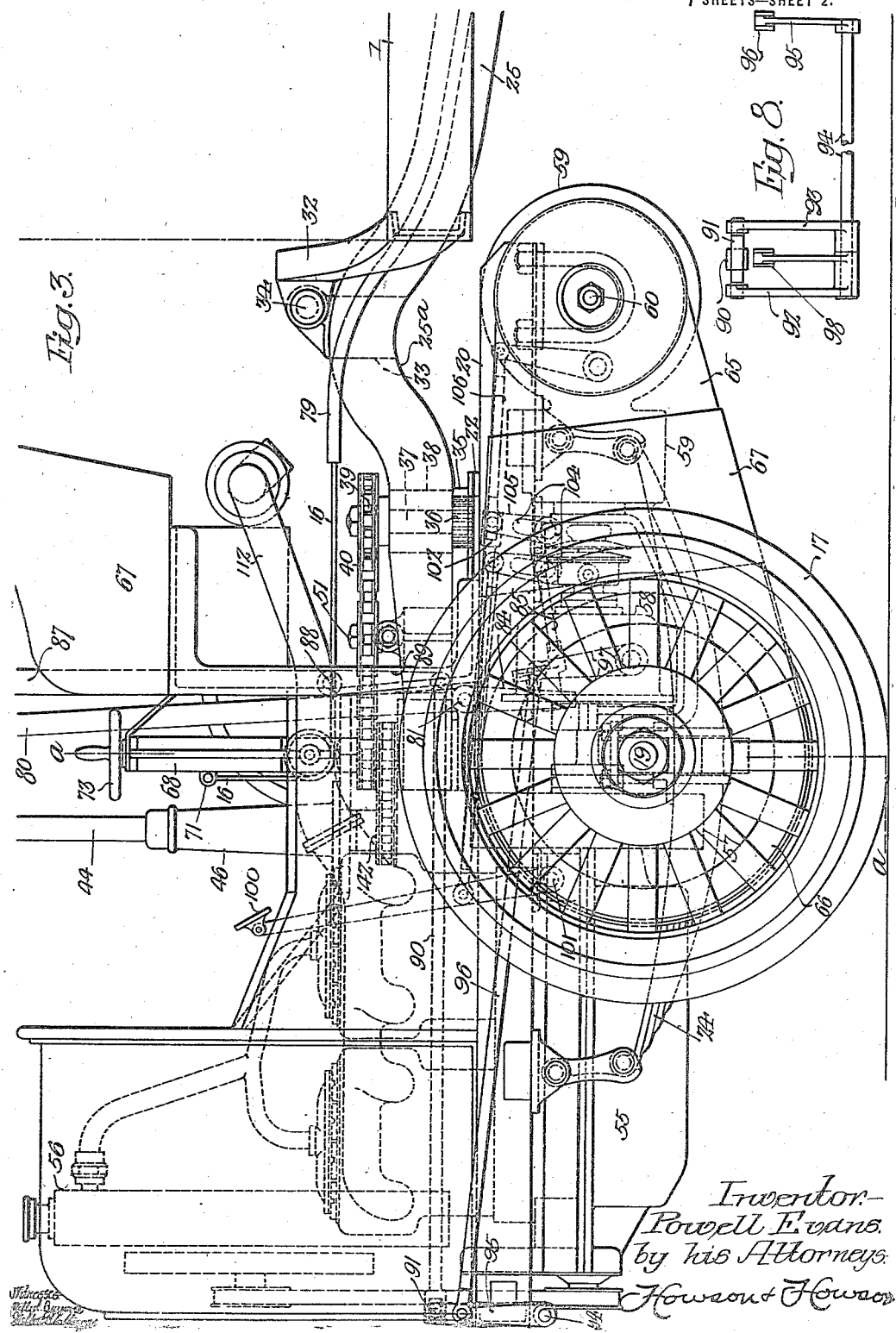

P. EVANS.
MOTOR TRACTOR.
APPLICATION FILED APR. 19, 1912.
1,228,306.
Patented May 29, 1917.
7 SHEETS—SHEET 3.
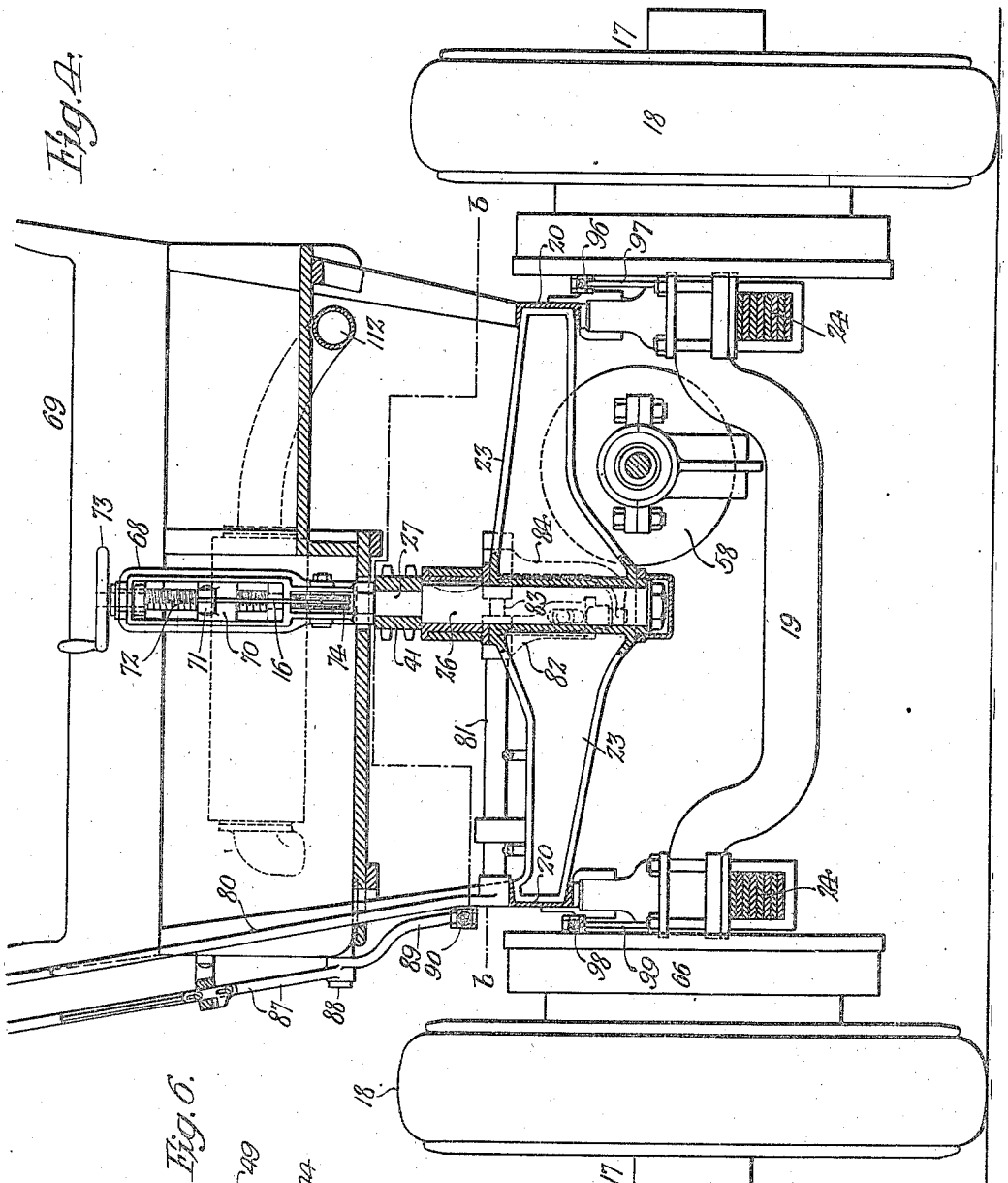
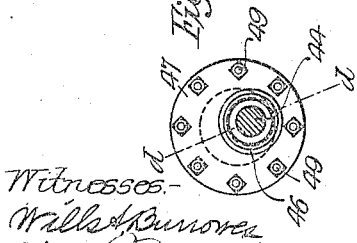
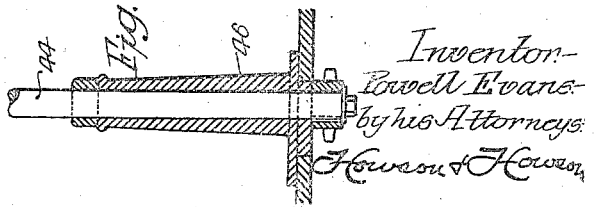

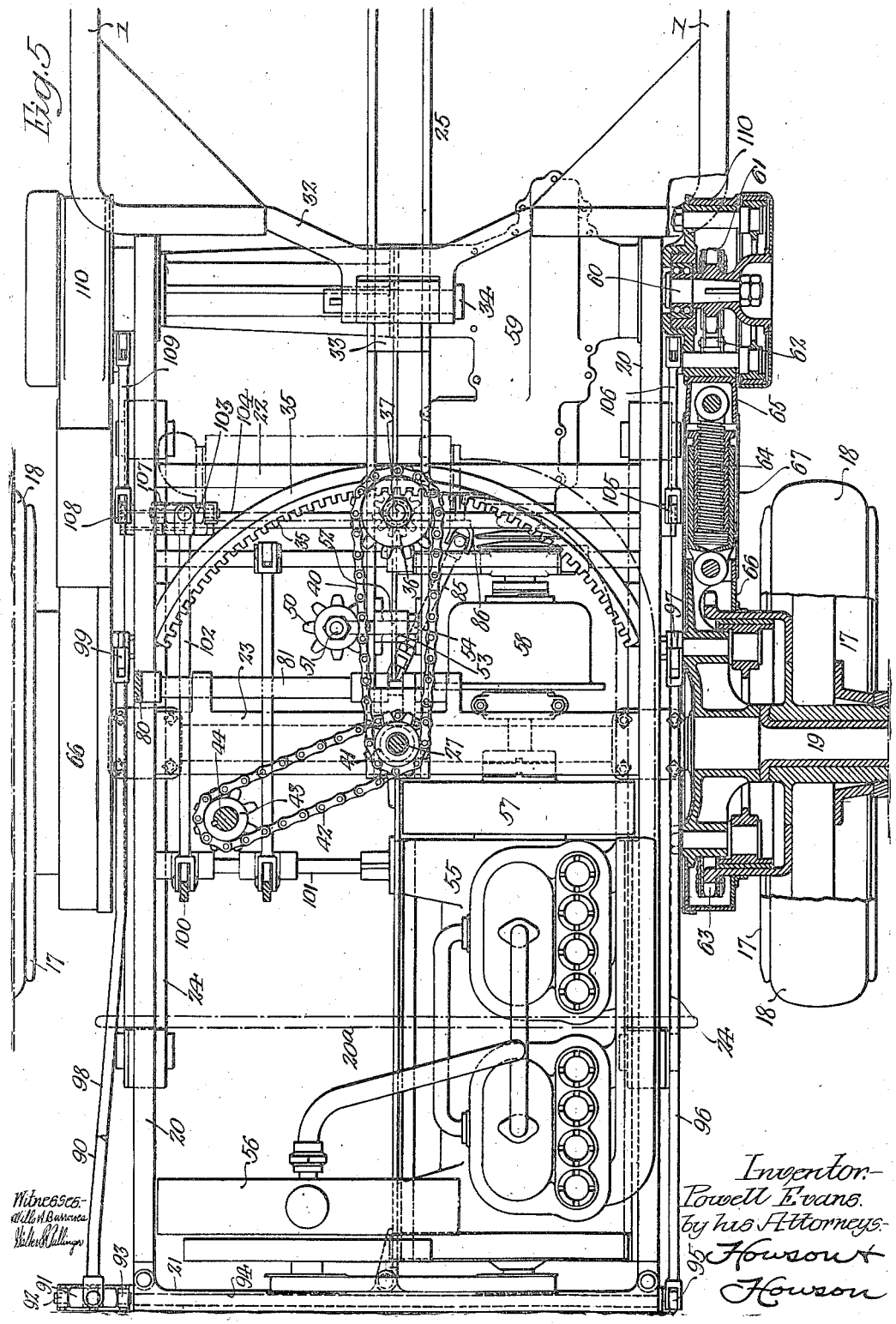

P. EVANS.
MOTOR TRACTOR.
APPLICATION FILED APR. 19, 1912.

1,228,306.

Patented May 29, 1917.
7 SHEETS—SHEET 5.

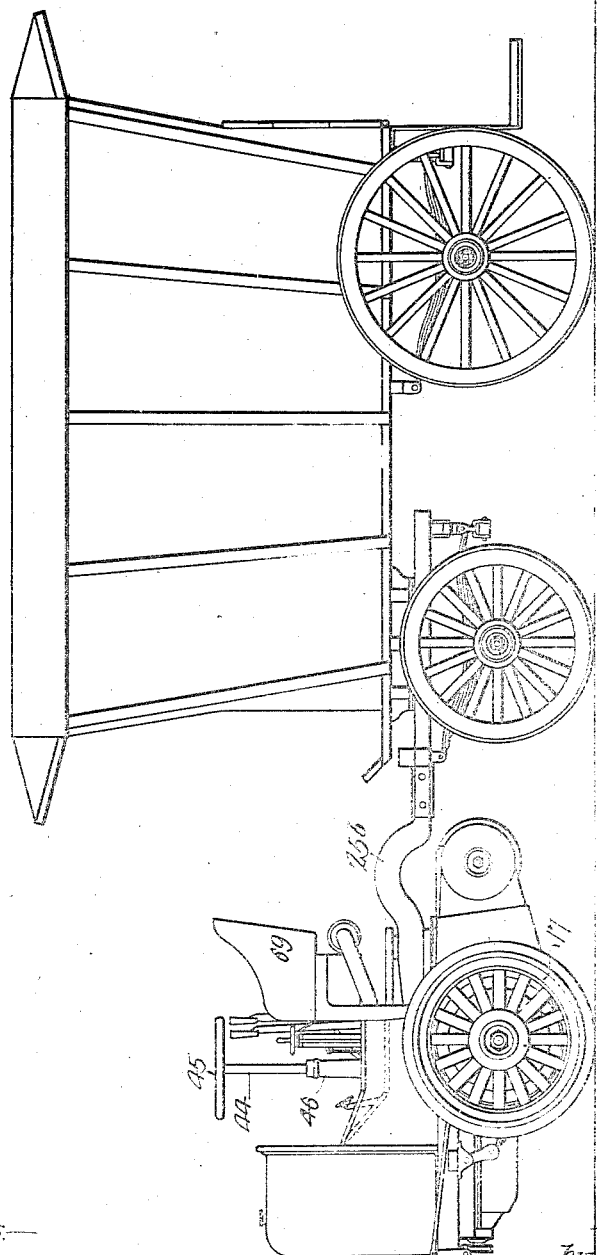

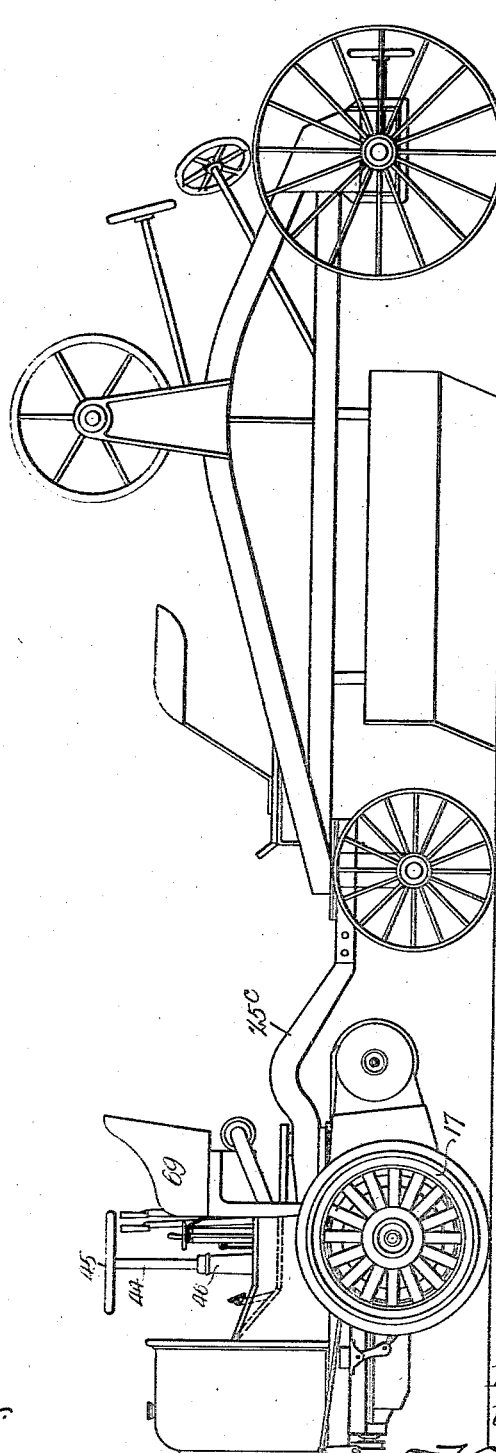

UNITED STATES PATENT OFFICE.

POWELL EVANS, OF PHILADELPHIA, PENNSYLVANIA.

MOTOR-TRACTOR.

1,228,306.	Specification of Letters Patent.	Patented May 29, 1917.

Application filed April 19, 1912. Serial No. 691,779.

*To all whom it may concern:*

Be it known that I, POWELL EVANS, a citizen of the United States, residing in Philadelphia, Pennsylvania, have invented certain Improvements in Motor-Tractors, of which the following is a specification.

One object of my invention is to provide a motor driven truck having a front wheel drive, which shall be relatively compact and substantial in construction, at the same time having its parts so designed and assembled as to permit of its being built at a relatively low cost.

A further object of the invention is to provide a truck, which while being driven by a motor, shall carry and propel its load under conditions substantially the same as those at present existing in horse drawn vehicles.

I also desire that the truck constituting my invention shall have its driving motor, transmission mechanism and the associated parts mounted on the front wheels, which may be provided with resilient tires, while the rear or load carrying wheels of the truck are preferably of the well known steel tire construction.

Another object of my invention is to provide novel braking mechanisms for a truck having the above noted characteristics, together with novel means for connecting the front and back parts of the truck structure; it being further desired that the truck shall have a novel form of steering mechanism as well as improved means for taking up wear or lost motion which may exist in various parts of such mechanism.

Another object of my invention is to provide a tractor unit which may be conveniently adapted for use with or applied to ordinary trucks or moving mechanisms of the horse drawn type, for the purpose of propelling the same.

These objects and other advantageous ends I secure as hereinafter set forth, reference being had to the accompanying drawings, in which, Figure 1 is a side elevation of a motor truck constructed according to my invention;

Fig. 3 is a side elevation on a large scale illustrating certain of the detail features of the tractor element;

Fig. 4 is a vertical section on the line a—a, Fig. 3 looking toward the rear of the truck;

Fig. 5 is an enlarged plan partly in section, taken on the line b—b Fig. 4;

Fig. 6 is a plan partly in section illustrating a detail of the steering mechanism;

Fig. 7 is a vertical section on the line d—d Fig. 6,

Fig. 8 is an elevation showing a detail of the braking mechanism, and

Figure 9:
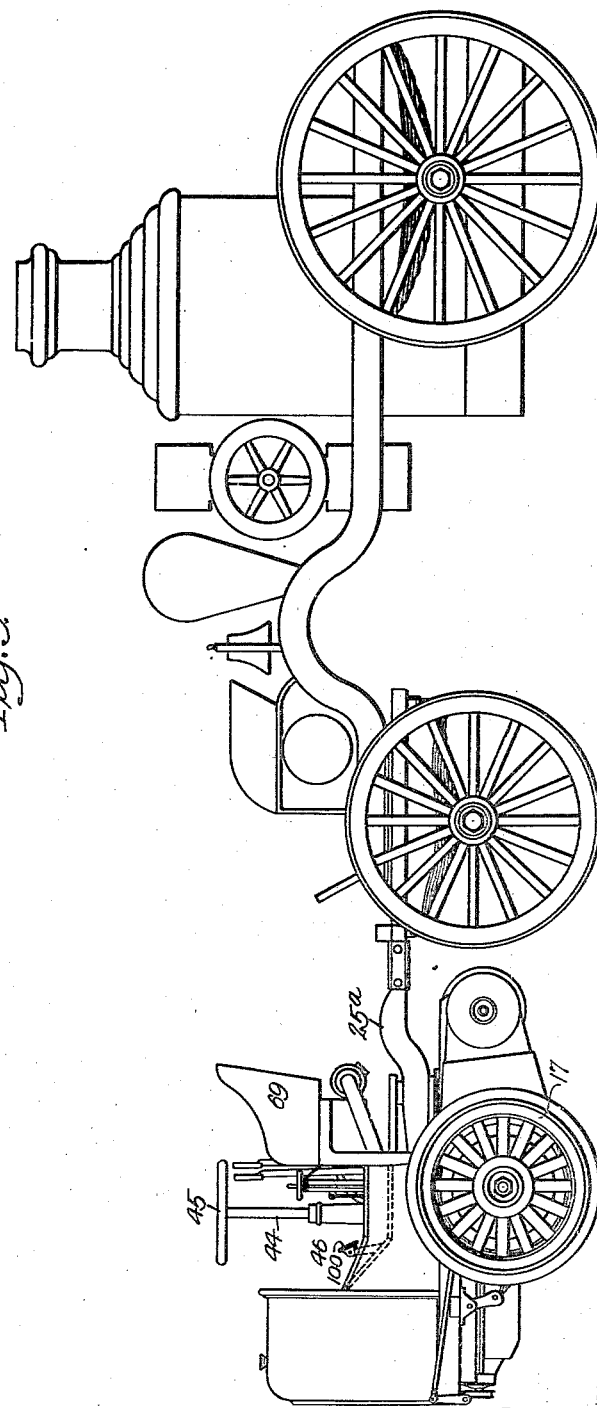

Figs. 9 to 11 inclusive are side elevations illustrating slightly modified forms of my tractor as applied to different forms of vehicles.

In the above drawings, 1 represents the carrying body of the truck which is supported on a rear axle 2, through relatively heavy springs 3. In the case illustrated, these springs are of the semi-elliptic type and their forward ends are connected to the body 1 by a bar 4 extending through the side members of the frame of said body. The rear ends of these springs are connected through shackles 5 to brackets 6 fixed in any suitable manner to the rear portions of the side members of the body 1.

The axle 2 has mounted upon it two wheels 7 of any suitable construction, preferably provided with tires of relatively durable material such as steel.

A brake for the rear wheels 7 is provided by a bar 8 extending transversely of the truck and hung from a pair of links 9 mounted on the pivot 10 between the shackle 5 and the bracket 6. The outer ends of said bar 8 have mounted on them brake shoes 11, and a pair of springs 12 are provided whereby said bar 8 with its shoes is at all times pressed in such a direction as to cause said shoes to bear upon the wheels 7. In this instance the springs are in the form of flat resilient strips attached at their upper ends to a cross member 13 of the frame of the truck body 1 and at their lower ends engaging the brake beam 8.

The cross member 13 also serves to support a bracket 14 on which is pivoted a downwardly extending lever 15, having the bar 8 passing through it at or adjacent its middle portion. Its lower end is connected to a brake rod 16 usually made of flexible wire cable, to which tension may be applied at the will of the operator through mechanism hereafter described.

The tractor element of my novel form of truck is provided with a single pair of wheels 17 preferably having rubber tires 18 and mounted on a single piece integral axle, 19 whose portion intermediate said wheels is bent downwardly as shown in Fig. 4. The frame of the tractor includes two longitudinally extending beams 20 constituting side members which are united by front and rear transverse beams 21 and 22 as well as by a transversely extending casting 23, and the frame itself is supported on a pair of springs 24 hung from the axle 19 in any suitable manner. It is noted that the front beam 21 is so made as to be conveniently detachable from the balance of the frame to permit of the easy dismounting of the engine which is supported as hereinafter described.

Figure 1:
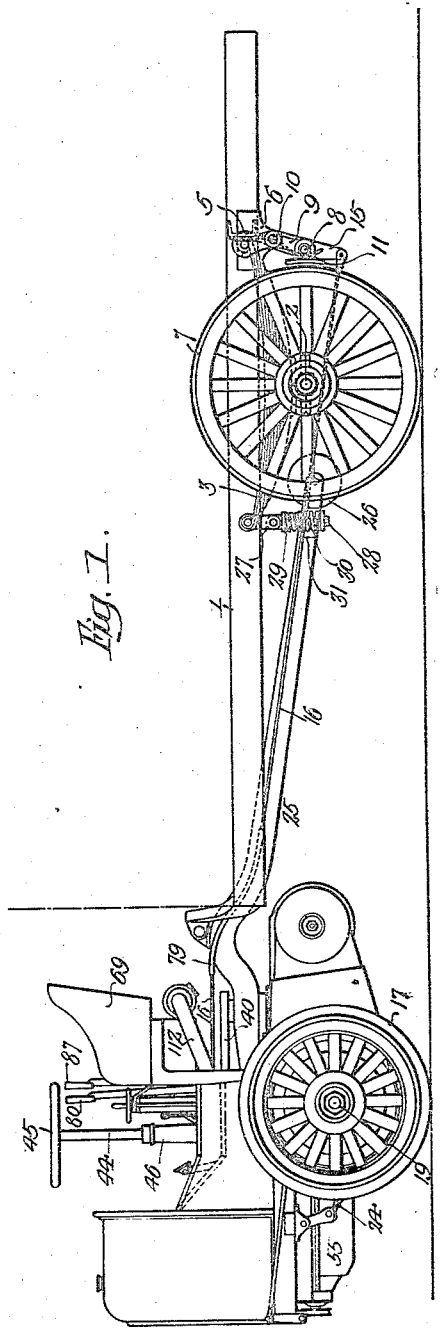

Resting upon and extending rearwardly from the transverse casting 23 is a tail piece formed by two substantially parallel beams 25, and pivoted to said casting by a king bolt 26, in the form of a sleeve within which is a shaft or spindle 27 hereafter referred to. Said tail piece, as shown in Fig. 3, may be given the form of a goose neck, as indicated at 25ª, in order to provide sufficient clearance between it and the rear parts of the transmission gearing hereafter described, and the rear of this goose neck is preferably extended toward the rear of the truck under the body 1, finally terminating, in the case illustrated, a short distance in front of the rear axle 2. Its rear end has rotatably mounted in it a small wheel 26 to facilitate its movement and properly support it when the tractor element is detached from the body and rear wheels. When these parts are coupled as shown in Figs. 1 and 2, the tail piece is hung from the transverse bar 4 through a link 27, a bolt 28 and two springs 29 and 30 between which is mounted a block 31.

Figure 2:
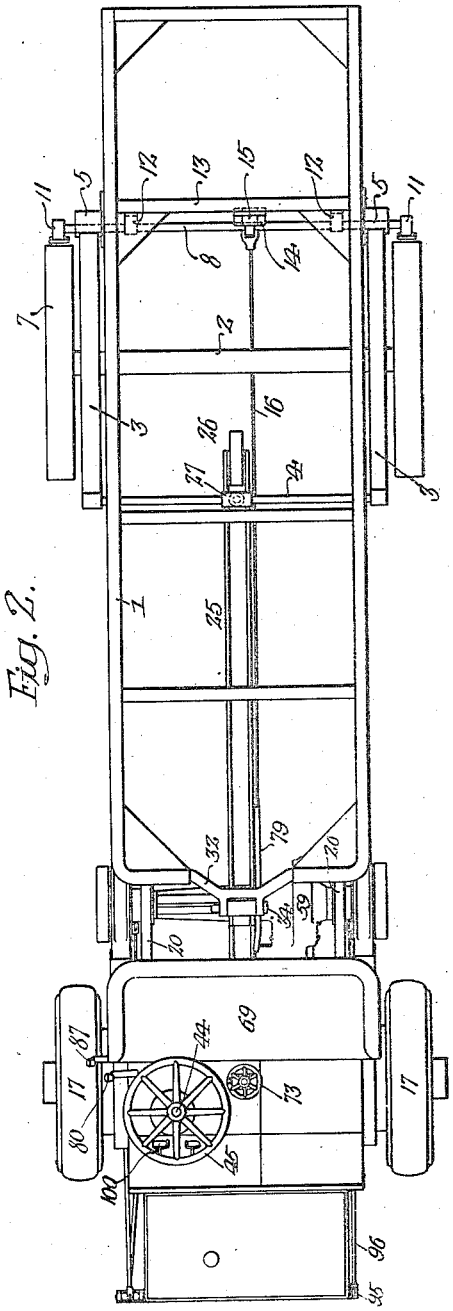
Fig. 2 is a plan of the truck shown in Fig. 1.

As shown in Fig. 2, the front portion of the body frame includes a bracket 32 having two forwardly extending lugs designed to receive between them an upwardly projecting lug 33 fixed in any suitable manner between the two beams constituting the tail piece 25. All of these lugs are perforated for the reception of a pivot bolt 34 whereby cushioned relative vertical movement is made possible between the frame 1 and the tractor element.

Fixed to the side members 20 and the transverse members 22 of the frame of the tractor element is a segmental rack 35 whose teeth are engaged by the teeth of a pinion 36 mounted on a spindle 37 journaled in a block 38 mounted in any suitable manner between the two beams of the tail piece 25. On the upper end of this spindle 37 is fixed a sprocket wheel 39 connected by a sprocket chain 40 to a double toothed sprocket wheel 41 loosely mounted on the spindle 27 and the king bolt so as to be concentric with the pivotal line or operative center line between the tractor element and the tail piece. The second set of teeth of this double sprocket are engaged by a sprocket chain 42 which also passes around a sprocket wheel 43, keyed or otherwise fixed to a steering post 44. This latter is equipped with the customary steering wheel 45 and passes through a supporting bearing 46, having a base 47 formed eccentrically to the line of said sleeve.

Said base is held to the floor 48 of the seat structure by a series of bolts 49, so that when turned on a vertical axis, the distance of the shaft 44 from the shaft 27 will be varied. By this means the slack in the chain 42 may be taken up as may be found necessary, by removing the bolts, turning the base plate 47 to the desired distance to suitably tighten the chain, and thereafter replacing said bolts.

For tightening the chain 40 I provide an idler sprocket 50 carried on a spindle 51, having an extension 52 in the form of a bolt mounted in a bracket 53 supported by the tail piece structure 25. The bolt and with it the sprocket wheel may be drawn toward the chain 40 so as to tighten the same by means of a nut 54 threaded on the end of said bolt.

The driving motor 55 for the truck, which in the present instance is shown as of the internal combustion type is mounted at one side of the front portion of the frame 20—21—22, the radiator 56 for said motor being mounted at the forward part of said frame, and by removing the frame member 21, said engine may be removed from the frame by sliding it out of the front thereof. The engine is provided with a fly wheel 57, a clutch 58, and suitable change speed gearing, the latter being inclosed within the casing 59. As shown in Fig. 5, the engine shaft extends longitudinally of the tractor element and from the change speed gearing driven thereby power is transmitted to the wheels 17 through the apparatus of which that for one wheel is shown in section in Fig. 5. This apparatus consists of the driven shaft 60 having keyed to it a sprocket 61 connected through a sprocket chain 62 to a second sprocket 63 fixed to the hub of the wheel 17. These sprocket wheels with their chain and the adjustable reach rod 64 are inclosed within a casing formed by castings 65 and 66 rotatably and concentrically mounted on the shaft structures 60 and 19 respectively, together with a flexible casing connecting said castings. I have not illustrated or described these parts in detail, inasmuch as they are fully described and claimed in an application filed by me on December 20, 1911, Serial No. 666,962.

For applying the brakes to the rear wheels 7 I provide the apparatus shown in Figs.

3 and 4, which consists of an open casting 68 mounted on the bolt 27 so as to project upwardly in convenient proximity to the driver's seat 69. This casting provides a guideway for a nut 70 having a projecting lug 71 and threaded for the reception of a screw 72 rotatably mounted in bearings provided by said casting; there being an operating wheel 73 fixed to the upper end of said screw. The brake rod, which in the present instance is in the form of a cable 16, has one end attached to the lug 71, from which it passes over a pulley 74 rotatably mounted in the lower part of the castings 68, and thence through a tubular guideway 79 carried by the tail piece 25 to the lower end of the lever 15.

Obviously the turning of the hand wheel 73 in one direction will cause the screw 72 to move the nut 70 upwardly, and thereby cause tension to be exerted on the cable 16, which through the lever 15 and rod 8, forces the brake shoes 11 into engagement with the wheels 7.

For shifting the change speed gears in the casing 59 I provide a hand lever 80 preferably mounted at one side of the driver's seat and fixed to a shaft 81 carried in bearings fixed to the transverse casting 23. Said shaft has fixed to it a downwardly extending arm 82 and at the same time is longitudinally slidable upon and splined to a smaller shaft 83, which has keyed to its end a downwardly extending arm 84. This latter through a rod 85 is connected to the operating rod 86 of the change speed gear, so as to actuate the same in the well known manner.

As is understood by those skilled in this art, the rod 86, in addition to being longitudinally movable in order to shift the change speed gears, is likewise rotatable for the same purpose, and through the arm 82, the longitudinal movement of the tubular shaft 81 on the shaft 83 within it, is caused to rotate the connecting rod 85 and hence the gear operating rod 86, to the extent necessary to make the desired combinations of gearing.

A second lever 87 is also pivotally mounted at the side of the driver's seat, being supported on a pivot bolt 88 and having an arm 89 extending downwardly below the pivot. To said arm is connected a forwardly extending rod 90 connected through a cross-bar 91 to two lever arms 92 and 93 both mounted on a transversely extending rod 94, carried in suitable bearings at the front of the frame 20—21.

The arm 93 is keyed to this transverse shaft, which at one side of the frame has an upwardly projecting arm 95 connected through a rod 96 with the operating lever 97 of the brake mechanism for one of the front wheels 17.

The second lever arm 92 is loosely mounted on the shaft 94, and has a second arm connected to a rod 98 which in turn is connected to the operating lever 99 for the brakes of the second of the front wheels 17. By the above arrangement of the arms 92 and 93, with their associated parts, a force applied to the rod 90 is equally divided between said arms and the corresponding brake shoes.

This braking mechanism for the front wheels is preferably designed for emergency use only, while for stopping or slowing down the truck under normal conditions I provide a foot lever 100, pivotally supported by means of a transverse bar 101 extending between one of the side members 20 of the tractor frame and a central longitudinal frame member 20ª mounted between the front frame member 21 and the central transverse casting 23. This foot lever is connected through a link 102 to a cross bar 103 which is mounted upon a transverse shaft 104, which at one extremity has fixed to it an arm 105 connected through a link 106 to the brake mechanism within the chain case or inclosing structure mounted on one end of the shaft 60. Loosely mounted on the shaft 104 is a sleeve carrying two arms 107 and 108 of which the first is connected to the link 102 and the second is connected through a link 109 with the brake mechanism inclosed within the structure 110 mounted concentrically with the shaft connecting the transmission mechanism in the casing 59 and the sprocket driving the second wheel 17 of the tractor element.

While the muffler 111 for the engine 55 may be placed in any convenient position, I have illustrated it as mounted back of and under the driver's seat 69 and connected to the engine cylinders through an exhaust pipe 112.

It is particularly to be noted that while in Figs. 1 and 2 I have illustrated my invention as used in connection with a truck or carrying body having a single pair of wheels, it may without material change be employed as the propelling means for wheel vehicles or other structures of widely different forms such as field artillery, road machines, etc. In other words, the tractor element, consisting of the driving wheels, the frame and body, with or without the tail piece and the parts mounted thereon, may be attached to ordinary vehicles primarily designed for horse propulsion, in the same manner as are the shafts or center pole now in use.

One important feature of the invention is the provision of a tractor element having its front axle in the form of a single integral structure, with a pivotal connection between the frame which is supported on this axle, and the tail piece. Such a combination of parts results in the mounting of the engine with its main shaft extending in a line to one side of the central longitudinal line of the tractor element. By the construction and arrangement of parts above noted the driving mechanism is compacted to a maximum extent, for while the change speed mechanism is to the rear and the engine is to the front of a vertical plane passing through the axle, the driving mechanism for the wheels extends forwardly to them from the driving shafts of said change speed gear.

While in Figs. 1 to 8 I have illustrated one form of tail piece as used for connecting the tractor to a two-wheeled vehicle, I have, in Figs. 9 to 11, illustrated it as slightly modified for attachment to various widely different forms of four wheel vehicles; it being shown in Fig. 9 as adapted for connection to a well known form of fire engine. In Fig. 10 I have shown my invention as attached to an ice wagon and in Fig. 11 it is illustrated as employed for the propulsion of a road making machine.

I claim—

1. A tractor element including a frame and a single pair of supporting wheels therefor; a tail piece consisting of an elongated rearwardly extending rigid supporting member pivotally connected to the frame; driving mechanism for the wheels; a horizontal pivotal structure whereby the body is connected to the tail piece at its forward end; and other means connecting the tail piece and body under the main portion of the latter.

2. A tractor element consisting of a frame; a pair of supporting wheels therefor; driving mechanism carried by the frame and operatively connected to the wheels; a tail piece pivotally connected to the frame; and means for turning said parts relatively to each other consisting of a toothed segment mounted on the frame; a sprocket wheel rotatably mounted on the tail piece; a gear connected to said wheel and meshing with said segment; and means for actuating the said wheel.

3. A tractor element consisting of a frame; a pair of supporting wheels therefor; driving mechanism carried by the frame and operatively connected to the wheels; a tail piece pivotally connected to the frame; a toothed segment mounted on the frame; a gear mounted on the tail piece and meshing with said segment; and means for turning said gear consisting of a pair of sprocket wheels of which one is connected to the gear; a chain connecting said wheels; means for turning the other one of the wheels; and means for taking up the slack of said chain.

4. A tractor element consisting of a frame; a pair of supporting wheels therefor; a driving mechanism carried by the frame and operatively connected on the wheels; a tail piece pivotally connected to the frame; a toothed segment mounted on the frame; a gear mounted on the tail piece and meshing with said segment; a driver's seat carried by the frame; a steering post mounted adjacent said seat; a sprocket on said post; a second sprocket connected to said gear; a pair of sprockets mounted concentrically with the pivot between the frame and the tail piece; and two sprocket chains respectively transmitting power between said sprocket wheels.

5. A tractor element consisting of a frame; a pair of supporting wheels therefor; driving mechanism carried by the frame and operatively connected to the wheels; a tail piece pivotally connected to the frame; a toothed segment mounted on the frame; a gear mounted on the tail piece and meshing with said segment; a driver's seat carried by the frame; a steering post mounted adjacent said seat; a sprocket on said post; a second sprocket connected to said gear; a pair of sprockets mounted concentrically with the pivot between the frame and the tail piece; two sprocket chains respectively transmitting power between said sprocket wheels; and independent means for taking up the slack in said two chains.

6. The combination in a tractor element of a frame; a tail piece pivotally connected thereto; and means for moving one of said parts relatively to the other; the same consisting of a steering post; a body structure supporting said post; a bearing structure for the post mounted on the body structure and rotatably adjustable eccentrically to said post; a sprocket wheel on the post; a second sprocket wheel mounted on the tail piece; means for transmitting movement from said second sprocket to the frame; and means including a sprocket chain connecting said two sprocket wheels.

7. The combination of a tractor element including a pair of driven wheels and a tail piece pivotally connected to the main portion of said element; a carrying body supported partly by the tail piece; wheels supporting the remainder of the body; and means for pivotally connecting said body to said tail piece.

8. The combination of a tractor element having a pair of driven wheels and a relatively narrow, centrally elongated tail piece; with a structure to be propelled including supporting wheels and a member pivotally connected to said tail piece at two points one in front of the other.

9. The combination of a tractor element having a frame; driving wheels; a tail piece; and a vertical pivot in a plane including the axle of the element for connecting said tail piece to the frame; with a structure to be propelled having supporting wheels and a substantially horizontal pivot operatively connecting it to the tail piece.

10. A tractor element consisting of a frame and wheels supporting the same; driving means for said wheels including change speed gearing; with a tail piece pivotally connected to said frame and having a goose neck portion to permit it to clear said change speed gearing.

11. A tractor element consisting of a frame and wheels supporting the same; driving means for said wheels including power transmission mechanism; and a tail piece pivotally connected to said frame and having a goose neck portion to permit it to clear said power transmission mechanism.

12. The combination of a tractor element; an element to be propelled including supporting wheels; braking mechanism for said wheels; brake operating mechanism carried by the tractor element; means for connecting said two elements to permit of their relative movement in two planes substantially at right angles to each other, and a flexible member connecting the braking mechanism with the brake operating mechanism.

13. The combination of a tractor element; a structure to be propelled including a body and supporting wheels; a tail piece pivotally connected to the tractor element and extending under the said body in position to carry a portion of the weight thereof; with means for pivotally connecting said tail piece and said body.

14. The combination of a tractor element; a structure to be propelled including a frame and a body supported thereby; a tail piece for the tractor element pivotally connected thereto and extending under the body; means for pivotally connecting the tail piece with the frame adjacent the front thereof; and other means for connecting the rear end of the tail piece to the structure to be propelled.

15. A tractor element consisting of a frame; a pair of wheels supporting the frame; driving mechanism carried by the frame and operatively connected to the wheels; a tail piece pivotally connected to the frame; a body supported at its forward end on said tail piece; wheels supporting the rear end of said body; and a supporting wheel for the extremity of the tail piece; with means for normally supporting said tail piece with its wheel raised in an inoperative position.

16. A tractor element consisting of a single integral axle structure; a pair of wheels mounted thereon; a frame carried by the axle structure; an engine and change speed gearing carried by the frame and respectively on opposite sides of the axle and both on one side of the longitudinal center line of said tractor element; with means for connecting the change speed gear to the engine and to the wheels.

17. A tractor element consisting of an axle; a pair of wheels therefor having driving sprockets and constituting the sole support of the tractor element; a frame carried by the axle; an engine mounted on the frame in front of the axle and to one side of the center line of the tractor element; a clutch connected to the engine; change speed gearing on the rear side of the axle connected to the clutch and including sprocket wheels; with chains connecting said sprocket wheels with the sprockets of the tractor wheels.

18. A tractor element consisting of a frame; power machinery thereon; a single pair of wheels constituting the sole support for the frame and operatively connected to said machinery; a tail piece pivotally connected to the frame; and means for moving the frame and tail piece relatively to each other, the same including a toothed segment fixed to the frame; a gear meshing with said segment and mounted on the tail piece; and means for turning said gear at will.

In testimony whereof, I have signed my name to this specification, in the presence of two subscribing witnesses.

POWELL EVANS.

Witnesses:
 WILLIAM E. BRADLEY,
 WM. A. BARR.